Feb. 20, 1934.                H. E. TAUTZ                1,947,885
                              WORK GUIDE
                          Filed June 19, 1933
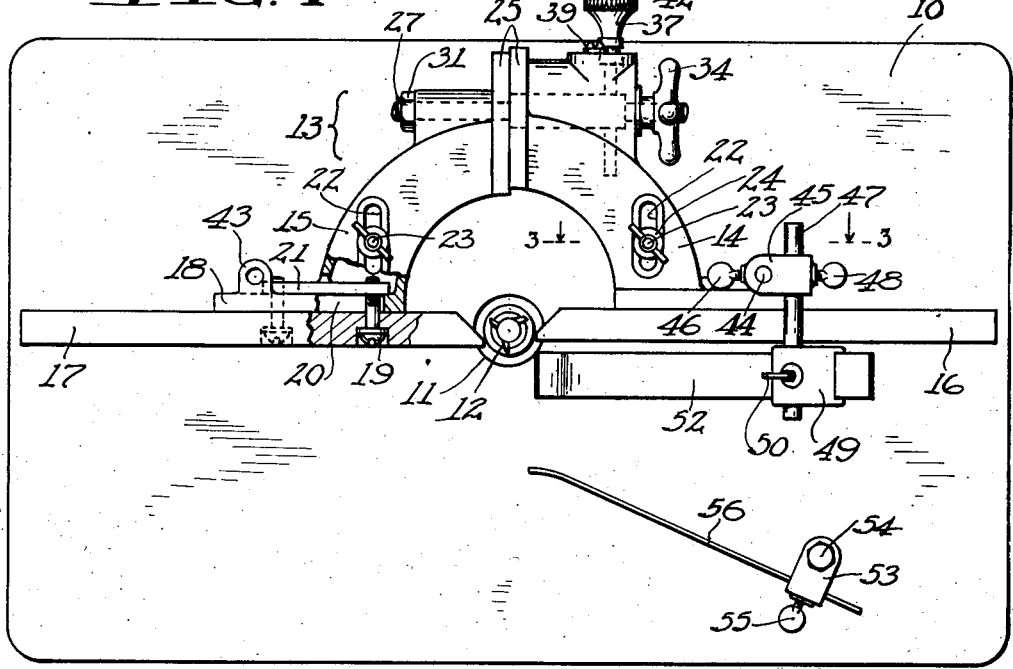
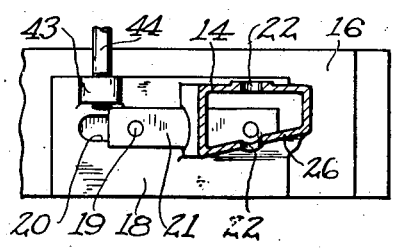
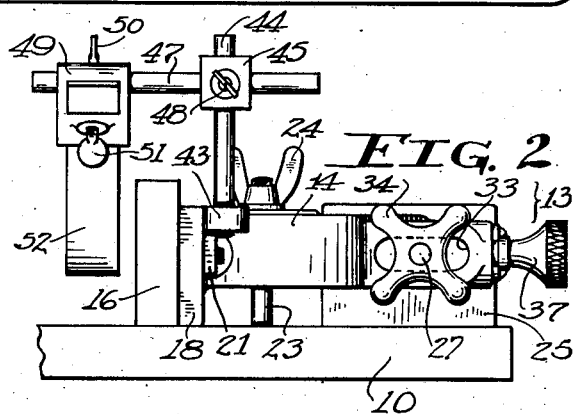
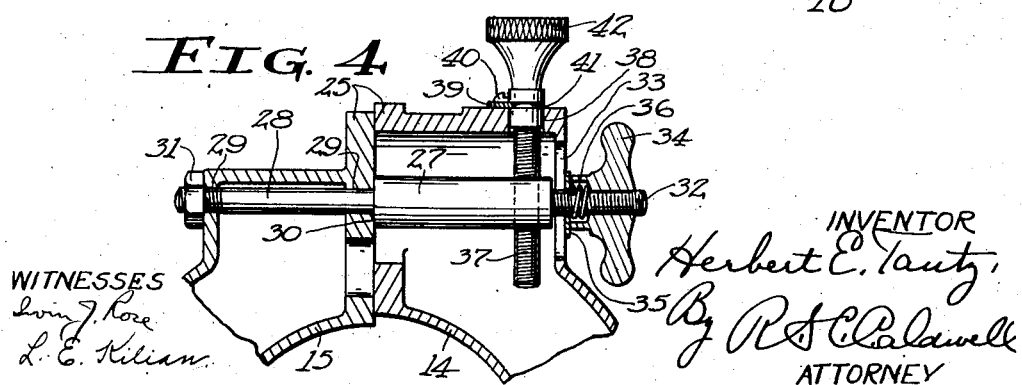
INVENTOR
Herbert E. Tautz,
By R. C. Caldwell
ATTORNEY
WITNESSES
Irving J. Rose
L. E. Kilian Patented Feb. 20, 1934

1,947,885

UNITED STATES PATENT OFFICE 1,947,885

WORK GUIDE

Herbert E. Tautz, Milwaukee, Wis., assignor to The Delta Manufacturing Company, Milwaukee, Wis., a corporation of Wisconsin Application June 19, 1933. Serial No. 676,485

8 Claims. (Cl. 144—253)

The invention relates to work guides for machine tools, and more particularly to fences for vertical-spindle shapers.

An object of the invention is to provide a shaper fence having front and rear sections spaced to form a cutter opening and capable of being set close to the rotary cutter for safety, at least one of the fence sections being adjustably mounted for different depths of cut, without disturbing the close setting of the fence sections with respect to the cutter.

Another object of the invention is to provide a shaper fence having front and rear sections either of which can be adjusted with respect to the other by the same adjusting means, without disturbing the set-up of the fence.

A further object of the invention is to provide a shaper fence having removable and readily adjustable wooden face plates by means of which the cutter opening may be made as small as possible to insure safety, the face plates being interchangeable with others of special shape for unusual work.

A further object is to provide a shaper fence which is capable of inexpensive manufacture and which is so constructed as to avoid clogging by chips.

The invention further consists in the several features hereinafter described and claimed.

In the accompanying drawing,

Fig. 1 is a top plan view of a shaper equipped with a fence embodying the invention;

Fig. 2 is an end view of the fence;

Fig. 3 is a detail sectional view taken on the line 3—3 of Fig. 1, and

Fig. 4 is a detail sectional view of the adjusting means for the fence.

In this drawing, 10 designates a shaper table having an opening 11 through which projects a suitably driven rotary shaping or molding cutter 12 arranged on a vertical axis.

A shaper fence, designated generally by 13, is mounted on the shaper table and comprises a pair of hollow sector-shaped sections 14 and 15 adjustably secured together, as hereinafter described, and carrying respective wooden face plates or bars 16 and 17 to guide the work. The face plates rest on edge on the table and have parallel work-guiding faces, here shown to be perpendicular to the top surface of the table. Each face plate abuts against a vertical flange 18 integrally formed on the respective fence section and resting on edge on the table 10, and is removably secured to the flange by countersunk screws 19 passing through a horizontal slot 20 in the flange and threaded into a retaining bar 21. The face plates are thus longitudinally adjustable to place their spaced adjacent ends, which are preferably beveled, in close proximity to the cutter 12, so as to effectively guard the cutter. In some instances, the cutter may cut a path in the ends of the face plates to further reduce the cutter opening. If desired, the face plates may have special profiles to adapt themselves to the work at hand.

Each fence section 14 and 15 is provided with aligned upper and lower slots 22 to receive an upstanding threaded stud 23 secured to the table. Each stud 23 carries a wing nut 24 by which the corresponding fence section is clamped to the table. The slots 22 extend at right angles to the face plates 16 and 17.

The fence sections 14 and 15 have respective laterally abutting vertical flanges 25 which rest on edge on the shaper table 10 and which extend at right angles to the flanges 18. The flanges 18 and 25 on each fence section are at opposite ends of the section, and between them the curved hollow portion of the fence section is raised from the table, as seen in Figs. 2 and 3 to permit free discharge of chips which are thrown and blown outwardly by the rotary cutter. To further facilitate the discharge of chips each fence section has an inclined bottom wall 26, as seen in Fig. 3, the inner edge of the wall being higher than the outer edge.

The fence sections 14 and 15 are releasably clamped together by a stud 27 extending through the abutting portions of the sections at right angles to the flanges 25. The stud 27 has a reduced end 28 which passes through aligned bores 29 in the section 15 and which forms a shoulder 30 engageable with the section. A nut 31 threaded on the reduced end 28 of the stud clamps the stud to the fence section. The opposite end 32 of the stud is also reduced in diameter and passes through a slot 33 in the fence section 14. A handwheel nut 34 on the stud portion 32 engages a washer 35 on the stud to clamp the section 14 to the stud. A spring 36 housed in the nut provides for frictional retention of the parts when the nut 34 is loosened. A horizonal adjusting screw 37 is threaded transversely through the stud 27 and is journalled in a bore 38 formed in the fence section 14. The adjusting screw is held against longitudinal movement with respect to the section 14 by a flat link 39 attached to the section by screws 40 and fitting in an annular groove 41 formed about the screw. The adjusting screw is provided with a knurled head 42.

The flanges 18 of the fence sections 14 and 15 carry threaded lugs 43, one of which receives an upright stem 44, here shown on the section 14. A bracket 45 is adjustably clamped to the stem by a wing screw 46, and a horizontal arm 47 is adjustably clamped in the bracket by a wing screw 48. A bracket 49 is adjustably clamped to the arm 47 by a wing screw 50, and has clamped thereto by a wing screw 51 a resilient metal strip 52 forming a work hold-down. A bracket 53 adjustably secured to the tabel 10 by a screw 54 has adjustably clamped thereto by a wing screw 55 a resilient metal strip 56 for holding the work against the fence.

The fence is mounted on the table by lowering it over the studs 23 and threading the nuts 24 onto the studs, the adjacent ends of the face plates 16 and 17 being near the cutter 12. Either of the front or rear fence sections can be laterally adjusted with respect to the other and to the cutter. If the front fence section 14 is to be adjusted, the clamping nut 24 therefor is loosened while the rear fence section 15 is left clamped to the table. The wheel nut 34 is also loosened and the adjusting screw 37 is then turned to effect the desired lateral translation of the front fence section, a relative sliding movement taking place between the flanges 25. The nuts 24 and 34 are then tightened to lock the fence section 14 in position. If the rear fence section 15 is to be adjusted, a similar procedure is followed, the front section being left clamped to the table. A slight error in the initial setting of the fence can be readily corrected at any time, even during the shaping operation, without disturbing the set-up. For some classes of work, the face plates are placed in alignment, while in other cases the face plates are offset. Either face plate may be advanced beyond the other, so that the work may be fed from right to left, or vice versa. The adjustment of the fence sections does not materially affect the close setting of the face plates with respect to the cutter.

What I claim as new and desire to secure by Letters Patent is:

1. In a work guide, the combination of a pair of guide sections each having a work-guiding portion and each adapted to be independently clamped to a table, and means common to said guide sections for laterally adjusting either of said sections when the other is clamped to the table.

2. In a work guide, the combination of a pair of guide sections having substantially parallel work-guiding portions and having relatively slidable abutting parts defining a path of relative displacement of said sections at substantially right angles to said work-guiding portions, and means for independently clamping each guide section to a table.

3. In a work guide, the combination of a pair of guide sections adapted to be independently clamped to a table and having substantially parallel guide portions adapted to have a work piece fed therealong from one to the other, and adjusting means common to said guide sections for laterally advancing either of said sections beyond the other when the latter is clamped to the table.

4. In a work guide, the combination of a pair of guide sections having substantially parallel work-guiding portions and having relatively slidable abutting portions, said guide sections adapted to be clamped to a table, a clamping member connecting said abutting portions, and an adjusting screw extending transversely of said clamping member and connecting said clamping member and one of said guide sections for laterally adjusting either of said sections when the other is clamped to a table.

5. In a work guide, the combination of a pair of guide sections each having upright flanges at its opposite ends arranged substantially at right angles to each other and adapted to rest on edge on a table, the space between said flanges and under each guide section forming a chip passage, means for adjustably securing together two corresponding flanges of said guide sections, and parallel work-guiding face members secured to the other flanges of said guide sections, said face members having spaced adjacent ends adapted to receive a cutter between them.

6. In a work guide, the combination of a pair of guide sections each having a work-guiding portion, means for independently clamping each guide section to a table, means common to said guide sections for laterally adjusting either of said sections when the other is clamped to the table, and means common to said guide sections for clamping said sections together.

7. In a work guide, the combination of a pair of guide sections having relatively slidable abutting portions, a clamping member connecting said abutting portions and secured to one of said sections, and an adjusting screw connecting said clamping screw and the other section for relatively displacing said sections laterally of each other, said screw transversely engaging said clamping member.

8. In a work guide, the combination of a pair of guide sections having work-guiding portions and relatively slidable abutting portions at an angle to said work-guiding portions, each guide section adapted to be independently clamped to a table, clamping means connecting said abutting portions, and means common to said guide sections for relatively displacing either of said sections in a direction along said slidable portions when the other is clamped to a table.

HERBERT E. TAUTZ.